March 31, 1970 B. AGRUSS ET AL 3,503,808
METHOD FOR REGENERATING MOLTEN METAL FUEL CELL REACTANTS
Filed Nov. 17, 1965 2 Sheets-Sheet 1

INVENTORS
Bernard Agruss
Earl H. Hietbrink
Tibor F. Nagey
BY
F. J. Soucek
ATTORNEY March 31, 1970     B. AGRUSS ET AL     3,503,808
METHOD FOR REGENERATING MOLTEN METAL FUEL CELL REACTANTS
Filed Nov. 17, 1965     2 Sheets-Sheet 2
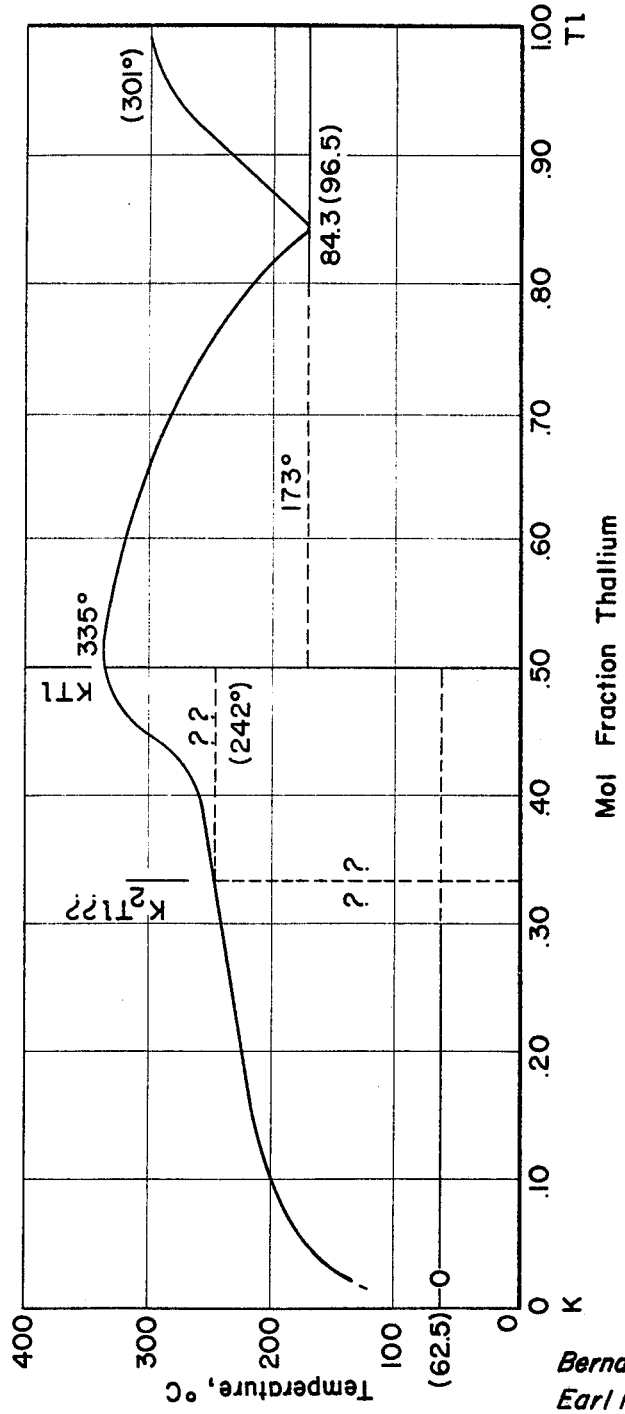
_Fig. 3_
INVENTORS
*Bernard Agruss*
*Earl H. Hietbrink*
*Tibor F. Nagey*
BY *F. J. Soucek*
ATTORNEY

United States Patent Office

3,503,808
Patented Mar. 31, 1970

3,503,808
METHOD FOR REGENERATING MOLTEN METAL FUEL CELL REACTANTS
Bernard Agruss, Earl H. Hietbrink, and Tibor F. Nagey, Indianapolis, Ind., assignors to General Motors Corporation, Detroit, Mich., a corporation of Delaware
Filed Nov. 17, 1965, Ser. No. 508,351
Int. Cl. H01m 27/00, 27/26, 27/30
U.S. Cl. 136—83                    3 Claims

ABSTRACT OF THE DISCLOSURE

A method for regenerating the reactants of a fuel cell wherein molten metal reactants are fed into a container or settling pot that is cooled in order to separate the reactants. The separated reactants are individually heated and returned to the fuel cell through separate conduits.

---

This invention relates to electrochemical cells having a positive molten metal electrode and more particularly to a method for the regeneration of the products formed during discharge of the cell.

The electrochemical cell in which this invention is concerned is described in U.S. patent to Agruss No. 3,245,836 filed Feb. 23, 1960 and assigned to the assignee of the subject application. This cell consists of a galvanic cell of the regenerative type frequently referred to as a fuel cell in which electrical current is generated by the oxidation of a cell reactant. In general, the cell comprises a positive molten metal electrode, a negative molten metal electrode and a molten salt electrolyte providing ionic conduction therebetween. The electrolyte preferably includes a salt containing the active metal of the negative electrode. In the overall electrode reaction, the metal of the negative electrode is oxidized and thereby dissolved into the electrolyte as a positive ion. Concurrently, the positive ion of the electrolyte is reduced to the free metal at the positive electrode whereupon it associates with the metal of the positive electrode. It is the tendency for this latter association to occur that provides the driving force for the reaction. If the molten metal at the negative electrode is designated A and the molten metal of the positive electrode designated B, then the overall fuel cell reactions are as follows:

Negative electrode—A (free)→A$^+$+1 electron
Positive electrode—A$^+$+1 electron→A (associated with B)
Total cell—A (free)→A (associated with B)

As previously indicated the cell reaction involves oxidizing metal A at the negative electrod eand reducing metal A ions at the positive electrode. Thus, in effect, metal A is continuously being lost from the negative electrode and accumulating at the positive electrode, intermixed with metal B.

The potential for the cell reaction varies inversely with increasing amounts of metal A in metal B. Accordingly, not only does operation of the cell involve consuming the negative electrode but in so doing cell potential is gradually decreased. Therefore, for long duration operation it is necessary to replenish metal A at the negative electrode and add metal B to the positive electrode while displacing equivalent quantities of the alloy of metal A and metal B withdrawn from the cell. Accordingly, this invention is concerned with a method for regenerating metal A and metal B from the displaced alloy and returning the separated metals back to their respective electrodes.

It is therefore an object of this invention to provide a method for regenerating fuel cell reactants by reducing the temperature of the cell effluent sufficiently to cause the formation of two phases which are separated and returned to the respective electrodes of the cell.

A further object of the present invention is to provide a continuous method for regenerating fuel cell reactants.

Other objects, features and advantages of our invention will become more apparent from the following description of specific embodiments thereof and from the drawing, in which:

FIGURE 3 is a phase diagram for a mixture of potassium and thallium which constitute fuel cell reactants in one embodiment of the invention.

Figure 1:
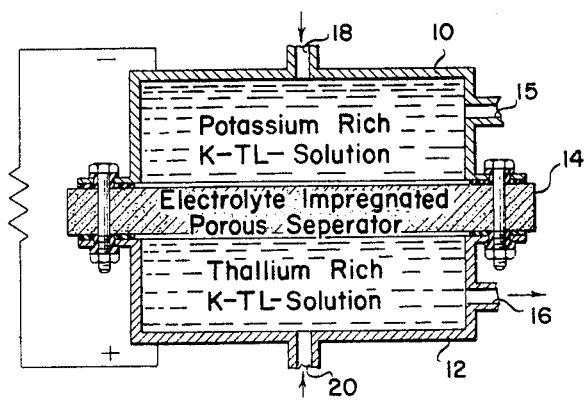
FIGURE 1 is a view schematically showing a particular type of cell construction, the reactants of which are regenerated according to our invention.

To better understand our method for regenerating cell reactants, it is necessary to explain the basic operation of the fuel cell. Referring to FIGURE 1 there is diagrammatically shown a galvanic cell formed from two flanged cup-shaped members 10 and 12 which are spaced from one another by a porous separator 14. A liquid potassium rich solution of potassium and thallium in the upper chamber 10 forms a negative electrode while a thallium rich solution of liquid potassium and thallium in the lower chamber 12 forms a positive electrode. The liquid electrodes are separated by a porous non-conductive material which is impregnated with potassium chloride. The porous separator 14 can be made of any suitable material which has the necessary porosity, inertness to the cell materials and high temperature stability which are required. Porous Alundum, for example, can be used. The potassium chloride with which the separator is impregnated, of course, is molten at the operating temperature of the battery.

The potential for the cell reaction varies as a logarithmic function of the ratio of the potassium concentrations in chambers 10 and 12. Accordingly the operation of the cell involves decreasing potassium concentration in the negative electrode and increasing potassium concentration in the positive electrode. The resulting solutions of potassium-thallium in chambers 10 and 12 are withdrawn from apertures 15 and 16, respectively. The liquid fuel cell effluent withdrawn from apertures 15 and 16 is mixed and then cooled to a sufficient temperature whereby it separates into a solid phase rich in potassium and a liquid phase rich in thallium. The two phases are then separated by conventional means, heated to the cell operating temperature, and returned to cell. The phase rich in potassium is introduced into the upper battery shell member 10 through aperture 18. The other phase rich in thallium is introduced into the lower battery shell member 12 through aperture 20. It is to be understood that the amount of material added to both the negative and positive electrodes is equal to amount of effluent displaced from the cell through apertures 15 and 16.

In regenerating the cell effluent into the individual cell reactants it is not necessary that the separation be complete because the cell will produce power even if each electrode consists of a mixture of metals. When this occurs the potential of the cell is lower than when the two electrodes consist of pure metals.

Figure 2:
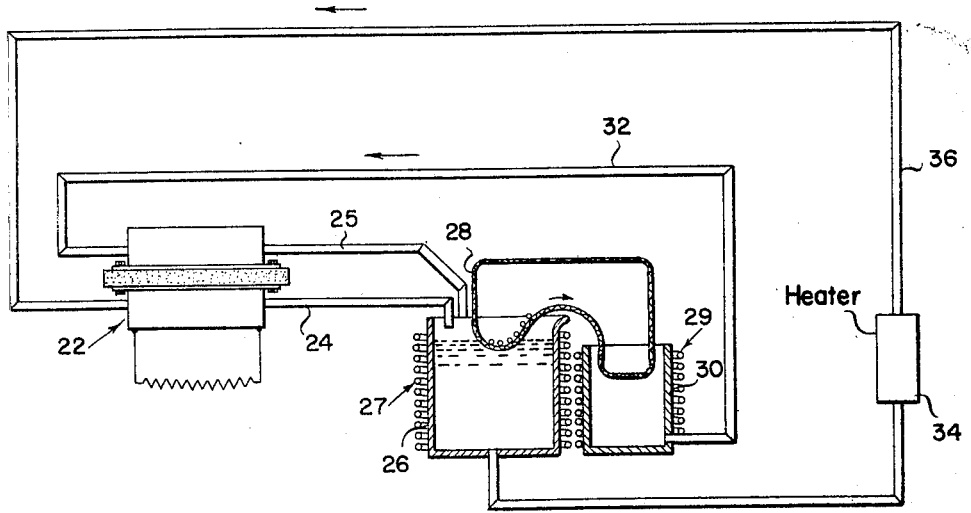
FIGURE 2 is a schematic flow diagram of a fuel cell including means for regenerating cell reactants according to one embodiment of this invention.

FIGURE 2 illustrates one system of regenerating the cell effluent which may be used to carry out the method of the present invention. The fuel cell is generally indicated at 22 and comprises a molten potassium-thallium solution, rich in thallium, as the positive electrode, a molten potassium-thallium solution, rich in potassium, as the negative electrode and molten potassium chloride providing ionic conduction therebetween. The cell is operated at a temperature in excess of 335° C. and develops approximately 0.6 volt. The molten cell effluent is withdrawn through lines 24 and 25 which are electrically insulated from each other and when combined in pot 26 form a solution containing .75 mol fraction thallium. The cell effluent is introduced into a settling pot 26 where it is cooled via cooling coils 27 to a temperature of about 173° C. Referring to the phase diagram of FIGURE 3 for potassium-thallium this temperature yields a solid phase containing about 0.5 mol fraction thallium and a liquid at equilibrium containing about 0.843 mol fraction thallium. The phase diagram of FIGURE 3 was worked out by N. S. Kurnakow and N. A. Puschin, Z. Anorg. Chem. 30, 1902, 87–101 using thermal analysis exclusively. Since the solid phase is less dense than the liquid phase it floats on the top of the liquid and is removed by a mesh-type conveyor belt 28. The mesh is sufficiently fine to prevent the solid metal from falling through but it is sufficiently coarse to allow excess liquid to drain back into the settling pot 26. The solid phase is conveyed into a melting pot 30 where it is heated by heating coils 29 to the cell operating temperature of about 335° C. and returned to the cell through line 32 to form the negative electrode. The liquid containing 0.843 mol fraction thallium is heated to approximately 335° C. by heat exchanger 34 and returned to the cell through line 36 to form the positive electrode. The system is made continuous simply by feeding cell effluent into the settling pot 26 and removing an equal amount of separated solid and liquid. It is to be understood that separation of the solid from the liquid in settling pot 26 may be accomplished by conventional means such as centrifugation, sedimentation, filtration, or flotation.

In addition to potassium and thallium other examples of metal combinations which have been found to be effectively separated in the regenerative system of a fuel cell constructed according to this invention are aluminum-selenium, aluminum-tellurium, bismuth-calcium, bismuth-potassium, bismuth-sodium, calcium-mercury, gallium-sodium, mercury-magnesium, potassium-tin, lithium-lead, magnesium-tin, tellurium-thallium, bismuth-lithium, bismuth-tellurium, calcium-lead, mercury-potassium, mercury-sodium, potassium-selenium, lithium-tin, sodium-antimony, magnesium - antimony, bismuth - magnesium, bismuth-thallium, calcium - antimony, lithium - thallium and tin-tellurium.

The electrolyte which is to be used in the fuel cell preferably includes a salt containing the active metal of the negative electrode. The active metal is that metal which is oxidized during discharge of the cell. Although the salt may be used alone as the electrolyte, mixtures of this salt with other salts not containing the active metal can be used. If two active metals are present in the cell it will generally be advantageous to employ a salt containing each of these metals in the electrolyte. In some instances, however, it may be preferred to employ an electrolyte containing another metal. In such instance we prefer that the electrolyte contain a comparatively high electropositive metal. The salt, of course, for the cell must be molten at a temperature at which the electrodes are molten.

Although our invention has been described in connection with certain specific examples thereof, the discussion and examples are only offered for purposes of explaining the invention. No limitation is intended thereby and other ramifications of our invention not specifically referred to herein may occur to those skilled in the art.

What is claimed is:
1. A process for regenerating the fuel cell reactants of an electrochemical cell including a positive molten metal electrode, a negative molten metal electrode and a molten salt electrolyte providing ionic conduction therebetween wherein the electrode metal combinations utilized are from the group consisting of potassium-thallium, aluminum-selenium, aluminum-tellurium, bismuth-calcium, bismuth - potassium, bismuth - sodium, calcium-mercury, gallium-sodium, mercury - magnesium, potassium - tin, lithium-lead, magnesium - tin, tellurium - thallium, bismuth - lithium, bismuth - tellurium, calcium - lead, mercury - potassium, mercury -sodium, potassium - selenium, lithium-tin, sodium - antimony, magnesium - antimony, bismuth - magnesium, bismuth - thallium, calcium-antimony, lithium - thallium and tin - tellurium, the discharge of said cell involving an interaction between the positive electrode metal and the negative electrode metal forming a solution of the fuel cell reactants, which comprises the steps of withdrawing the solution from said cell, reducing the temperature of said alloy sufficiently so that it separates into a solid and a liquid phase, one of which is rich in the positive fuel cell reactant and the other which is rich in the negative fuel cell reactant, heating the phases to the operating temperature of the fuel cell, conveying the phase rich in the positive fuel cell reactant to said positive electrode, and conveying the other phase rich in the negative fuel cell reactant to the negative electrode of said cell.

2. A process according to claim 1 wherein said positive molten metal electrode consists of a thallium rich solution of potassium and thallium, said negative molten metal electrode consists of a potassium rich solution of potassium and thallium and said electrolyte consists of molten potassium chloride, said solution withdrawn from the cell consisting essentially of 0.75 mol fraction thallium, reducing the temperature of said solution until it separates into a solid phase containing about 0.5 mol fraction thallium and a liquid phase containing about 0.843 mol fraction thallium, separating said phases, reheating said phases to the operating temperature of said fuel cell and conveying the phase containing 0.5 mol fraction thallium to the negative electrode of the fuel cell and conveying the phase containing 0.843 mol fraction thallium to the positive electrode of the fuel cell.

3. A process according to claim 1 including means for continuously transferring the solution from said cell to said separating means and means for continuously reconveying the separated phase rich in the positive electrode metal from said separating means to said positive electrode of said cell and means for continuously reconveying the separated phase rich in the negative electrode metal from said separating means to said negative electrode of said cell.

References Cited

UNITED STATES PATENTS

| | | | |
|---|---|---|---|
| 2,180,139 | 11/1939 | Deitz | 75—93 |
| 2,723,033 | 11/1955 | Jones et al. | 210—72 |
| 3,030,400 | 4/1962 | Giraitis | 136—83 |
| 3,169,855 | 2/1965 | Pelzel | 75—93 |
| 3,245,836 | 4/1966 | Agruss. | |

A. B. CURTIS, Primary Examiner

U.S. Cl. X.R.

75—93